US012401974B2

(12) United States Patent
Rosales et al.

(10) Patent No.: US 12,401,974 B2
(45) Date of Patent: Aug. 26, 2025

(54) DYNAMIC V2X NETWORKS AND VEHICLE ROUTING

(71) Applicant: Intel Corporation, Santa Clara, CA (US)

(72) Inventors: Rafael Rosales, Unterhaching (DE); Florian Geissler, Munich (DE); Michael Paulitsch, Ottobrunn (DE); Ralf Graefe, Haar (DE); Neslihan Kose Cihangir, Munich (DE)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 17/131,712

(22) Filed: Dec. 22, 2020

(65) Prior Publication Data

US 2021/0112388 A1    Apr. 15, 2021

(51) Int. Cl.
*H04W 4/40*    (2018.01)
*G01C 21/34*    (2006.01)
*G08G 1/0968*    (2006.01)
*H04W 24/08*    (2009.01)
*H04W 84/00*    (2009.01)

(52) U.S. Cl.
CPC .......... *H04W 4/40* (2018.02); *G01C 21/3461* (2013.01); *G01C 21/3492* (2013.01); *G08G 1/096833* (2013.01); *H04W 24/08* (2013.01); *H04W 84/005* (2013.01)

(58) Field of Classification Search
CPC ..... H04W 4/40; H04W 24/08; H04W 84/005; H04W 4/021; H04W 4/024; H04W 4/025; G01C 21/3461; G01C 21/3492; G08G 1/096833; G08G 1/0112; G08G 1/0129; G08G 1/202; G06Q 10/02; G06Q 10/063; G06Q 50/40

USPC .......................................................... 701/424
See application file for complete search history.

(56) References Cited

U.S. PATENT DOCUMENTS 10,602,329 B2 * 3/2020 Addepalli ............. H04W 40/20
10,616,734 B1 * 4/2020 Lekutai ................. H04W 4/027
11,395,218 B2 * 7/2022 Lopes ..................... H04W 4/40
(Continued)

FOREIGN PATENT DOCUMENTS

EP    3203188 A1 *  8/2017

OTHER PUBLICATIONS

Francesco Calabrese, "Urban Sensing Using Mobile Phone Network Data : A Survey of Research", Nov. 2014, ACM Computing Surveys, vol. 47, No. 2, Article 25 (Year: 2014).*

(Continued)

*Primary Examiner* — Peter D Nolan
*Assistant Examiner* — Preston Jay Miller
(74) *Attorney, Agent, or Firm* — Schwegman Lundberg & Woessner, P.A.

(57) ABSTRACT

Disclosed embodiments prioritize gaps in V2X coverage and then selectively route traffic based on the prioritized gaps. Some embodiments combine historical vehicle presence along a route with predicted prospective vehicle traffic along the route to generate a map of regions that have a high confidence of a need for V2X coverage. This high confidence map is compared to a historical V2X coverage in those regions. From this comparison, a set of high priority V2X gaps is identified. Vehicles are then selectively routed either around or into the gaps.

20 Claims, 12 Drawing Sheets

(56) References Cited

U.S. PATENT DOCUMENTS

| | | | |
|---|---|---|---|
| 2016/0252350 A1* | 9/2016 | Wharton | G01S 19/39 |
| | | | 701/25 |
| 2017/0176192 A1* | 6/2017 | Cardoso de Moura | |
| | | | H04W 4/024 |
| 2018/0132121 A1* | 5/2018 | Correia e Costa | H04W 24/08 |
| 2020/0027354 A1* | 1/2020 | Goldman | G06Q 10/063118 |
| 2020/0106563 A1* | 4/2020 | Akoum | H04B 7/026 |
| 2021/0089938 A1* | 3/2021 | Ariannezhad | G08G 1/096775 |

OTHER PUBLICATIONS

"European Application Serial No. 21198502.3, Response filed Nov. 10, 2022 to Extended European Search Report mailed Mar. 17, 2022", 11 pgs.

"European Application Serial No. 21198502.3, Extended European Search Report mailed Mar. 17, 2022", 10 pgs.

"Vehicle-to-Vehicle Communications: Readiness of V2V Technology for Application", U.S. National Highway Traffic Safety Administration, (Aug. 2014), 327 pgs.

"Terrestrial Trunked Radio (Tetra)", https: www.etsi.org technologies tetra, 2 pgs.

Cheng, "A geometry-based coverage strategy over urban VANETs", (2013), 8 pgs.

Chunxiao, Li, "Access and connectivity probability for V2X communication networks", 2017 13th IEEE International Conference on Electronic Measurement and Instruments (ICEMI), (Oct. 2017), 5 pgs.

* cited by examiner

DYNAMIC V2X NETWORKS AND VEHICLE ROUTING

BACKGROUND

Collaborative and automated vehicles (C-AV) are expected to navigate the streets of cities, but there is no guarantee that cities will provide vehicle to everything (V2X) infrastructure along all routes or even the most traveled routes. As a result, only a subset of routes are likely to benefit from the multiple safety-enhancing services that V2X communications can provide. Collaborative vehicles promise to enable and/or extend environmental awareness by facilitating a shared view of a road environment generated by integrating the views of multiple vehicles. This more comprehensive situational awareness provided by collaborative vehicles, along with a capability to provide a rapid notification of events that occur along a route promise to enable other vehicles to react to the event in a timely manner, and thus improving overall safety.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The disclosed embodiments are generally directed to a mobility planning service. The mobility planning service enhances safety by increasing a probability that V2X services are available along a route of travel. The disclosed embodiments recognize that C-AV's can dynamically create ad-hoc vehicular networks (VANETs) based on peer-to-peer cellular- or dedicated short range communication (DSRC)-based V2X. However, creation of such VANETS generally requires a plurality of C-AVs to be within a V2X range of each other.

The disclosed embodiments identify gaps in V2X coverage along a route of travel. Moreover, some of the disclosed embodiments prioritize those gaps that are highly relevant to improving the safety of vehicular travel.

In some embodiments, a route of a vehicle is determined so as to avoid a gap in V2X coverage. In some embodiments, this routing considers temporal fluctuations in V2X coverage that occur due to time of day or day of week, or even seasonal related variations in traffic levels. In other embodiments, a vehicle or a plurality of vehicles are routed so as to fill gaps in V2X coverage. This allows the routed vehicles to mutually benefit from each other's presence along their assigned routes. In some cases, the mobility planning service pre-positions a vehicle or several vehicles along a route having relatively weaker V2X coverage. These vehicles, in some embodiments, remain parked along the route but function to relay V2X messages received from other vehicles. These stationary vehicles are also configured, in some embodiments, to generate their own V2X messages based on measurements of one or more on-board sensors.

In some embodiments, gaps in V2X coverage are prioritized based on a probabilistic model that predicts how many prospective vehicle trips or how many vehicle miles will receive lower than desired V2X coverage. For example, a first gap within a first route that experiences a first number of trips per day will be prioritized lower, in at least some embodiments, that a second gap along a second route that experiences a second number of trips per day that is larger than the first number.

Figure 1:
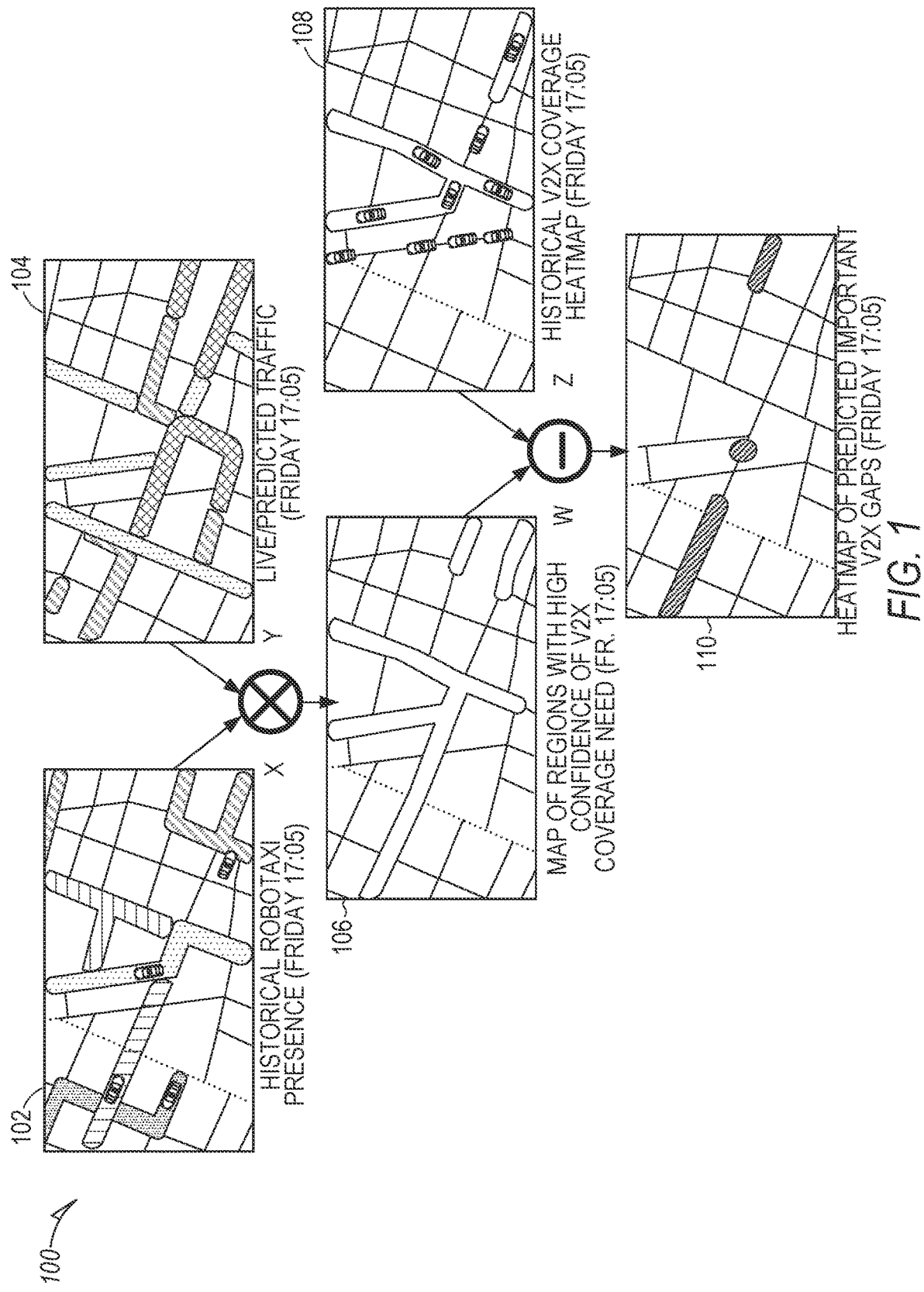
FIG. 1 is an overview diagram illustrating an example data flow in some of the disclosed embodiments.

FIG. 1 is an overview diagram illustrating an example data flow in some of the disclosed embodiments. In some embodiments, the data flow 100 shown in FIG. 1 is implemented by a control system, such as the control system 660 discussed below with respect to FIGS. 6A-B. FIG. 1 shows several maps, which are visual depictions of corresponding sets of data, discussed below as first data, second data, third data, fourth data, and fifth data, shown visually as a first map 102, second map 104, third map 106, fourth map 108, and fifth map 110 respectively. Dimensions of the data and maps are determined, in some embodiments, via a quadtree for tractal splitting of space into quadrants. Each of the quadrants is described as a region in the present disclosure. Dimensions of the regions vary by embodiment, but is controllable, in some embodiments, via a parameter "L" which defines a length of square regions. "L" is between 10 and 400 meters in some of the disclosed embodiments. The maximum 400 meter value corresponds to a maximum range for V2X communications, and the minimum value 10 meters still provides for an ability to discern between adjacent routes that have isolated wireless channels.

FIG. 1 visually depicts several maps of a plurality of regions. Each map characterizes the plurality of regions in a different manner so as to identify a high priority set of regions for which V2X coverage should be provided. A first map 102 visually depicts historical vehicle traffic during a particular period of time. In some embodiments, only autonomous vehicle traffic is considered, while in other embodiments, both autonomous and non-autonomous vehicle traffic is included in the first map 102.

The different amounts of shading shown over routes within the regions represent different amounts of historical vehicle traffic. A second map 104 visually depicts predicted and/or live traffic levels within the same set of regions and routes as those of the first map 102. FIG. 1 shows that first data shown in the first map 102 and second data visually depicted in the second map 104 are fused to generate a third set of data, visually depicted in a third map 106.

The third data indicates regions with a high need of V2X coverage during the relevant time period. In some embodiments, third data, and thus a need for V2X coverage in a particular region is generated by comparing the historical vehicle traffic during a particular time period in first data to second data's predicted and/or live traffic levels in corresponding regions. The comparison establishes a confidence score in each region. The confidence score indicates a necessity to fill a V2X coverage need in the region. For example, if many autonomous vehicles navigate through a particular region, a relative need to provide V2X coverage in that region is higher than when fewer autonomous vehicles navigate through the particular region. Some embodiments compute the confidence score via a point wise multiplication of inputs from corresponding inputs from first data and second data. The contribution is weighted by two parameters, shown in FIG. 1 as X and Y, which weight each contribution from first data and second data when determining the confidence score.

FIG. 1 also shows a fourth map 108 visually depicting fourth data. Fourth data represents historical observations of V2X coverage in the same plurality of regions represented by first, second, and third data. In some embodiments, values in third data are between zero (0) and one (1). In some embodiments, a value of zero indicates no presence of V2X messages detected within a time window for which the third data applies. A value of one (1) indicates that a predefined threshold number of messages, considered to provide adequate robustness of a V2X network are present.

FIG. 1 illustrates that the third data, representing a need for V2X coverage in each of the plurality of regions, and fourth data, representing historical V2X availability in the plurality of regions, are combined to generate fifth data, visually illustrated via a fifth map 110. Fifth data indicates regions that include V2X gaps of relatively high priority. In other words, fifth data indicates regions having V2X gaps that are also expected to experience a relatively high amount of traffic.

Fifth data, represented by the fifth map 110, is generated, in some embodiments, by subtracting region values of fourth data from corresponding regions of third data. The subtraction is performed, in some embodiments, according to strength indications of fourth data. The strength of information in fourth data indicates how much V2X activity has been typically found within a particular region and during a particular time represented by fourth data. When remains after the subtraction is a set of routes that are important but have a history of less V2X coverage than needed.

Therefore, filling these gaps will make a relatively larger contribution to improving vehicle safety that filling other gaps in regions that map be less likely to experience the same level of traffic.

In some embodiments, to predict a total V2X coverage of an entire route, values of fifth data within regions traversed by the route are aggregated and then divided by the number of regions traversed by the route. This provides a normalized coverage score for the route (in some embodiments, the score is between zero (0) and one (1)).

While FIG. 1 shows a plurality of maps, each of the illustrated maps and their corresponding data represent a particular finite period of time. As discussed further below, at least some of the disclosed embodiments determine first data, second data, third data, fourth data, and fifth data for each of a plurality of different time periods. When generating a vehicle route to be executed during a particular time period, some of these embodiments then identify a matching set of first data, second data, third data, fourth data, and fifth data for a time period analogous to that of the planned route. For example, a route planned during weekday rush hour traffic is determined based on a set of first data, second data, third data, fourth data, and fifth data, where the set is determined based on historical and predicted traffic, as well as V2X coverage information relevant to similar or at least analogous time periods.

Some of the disclosed embodiments thus detect "important" V2X coverage gaps in typical routes traveled by vehicles. Some of these embodiments then relocate idle or other vehicles to minimize the identified coverage gaps. By determining overlapping areas of V2X coverage and vehicle travel, regions of high use by vehicles but relatively low (e.g. below a predefined threshold) V2X coverage are identified. Some embodiments maintain a list of such regions, and reposition vehicles (e.g. C-AVs) to fill the V2X gaps in high traffic regions. In some embodiments, the repositioned vehicles are statically placed, or assigned a route to repeatedly traverse. The assignment of the route is based, in some embodiments, on a heuristic to optimize for costs, such as energy consumption, proximity to desired regions, and/or parking availability.

Some embodiments contemplate the participation of 3rd party owned vehicles in filling V2X coverage gaps (e.g. identified by fifth data). For example, 3rd parties share their vehicle communication resources via remuneration in some embodiments. When participating in the 3rd party program, a 3rd party vehicle enables, in some embodiments, its V2X subsystem to act as a V2X hop in an ad-hoc network while parked (e.g. on a street). A provisioning of such a service is remunerated, in at least some embodiments, via a subscription service that allows the vehicle to receive requests to share its communication resources. The request may originate from a TNC that is attempting to reduce a V2X coverage gap (e.g. identified via fifth data above). As such, the TNC is motivated to pay the third party for the use of their V2X subsystem.

Figure 2:
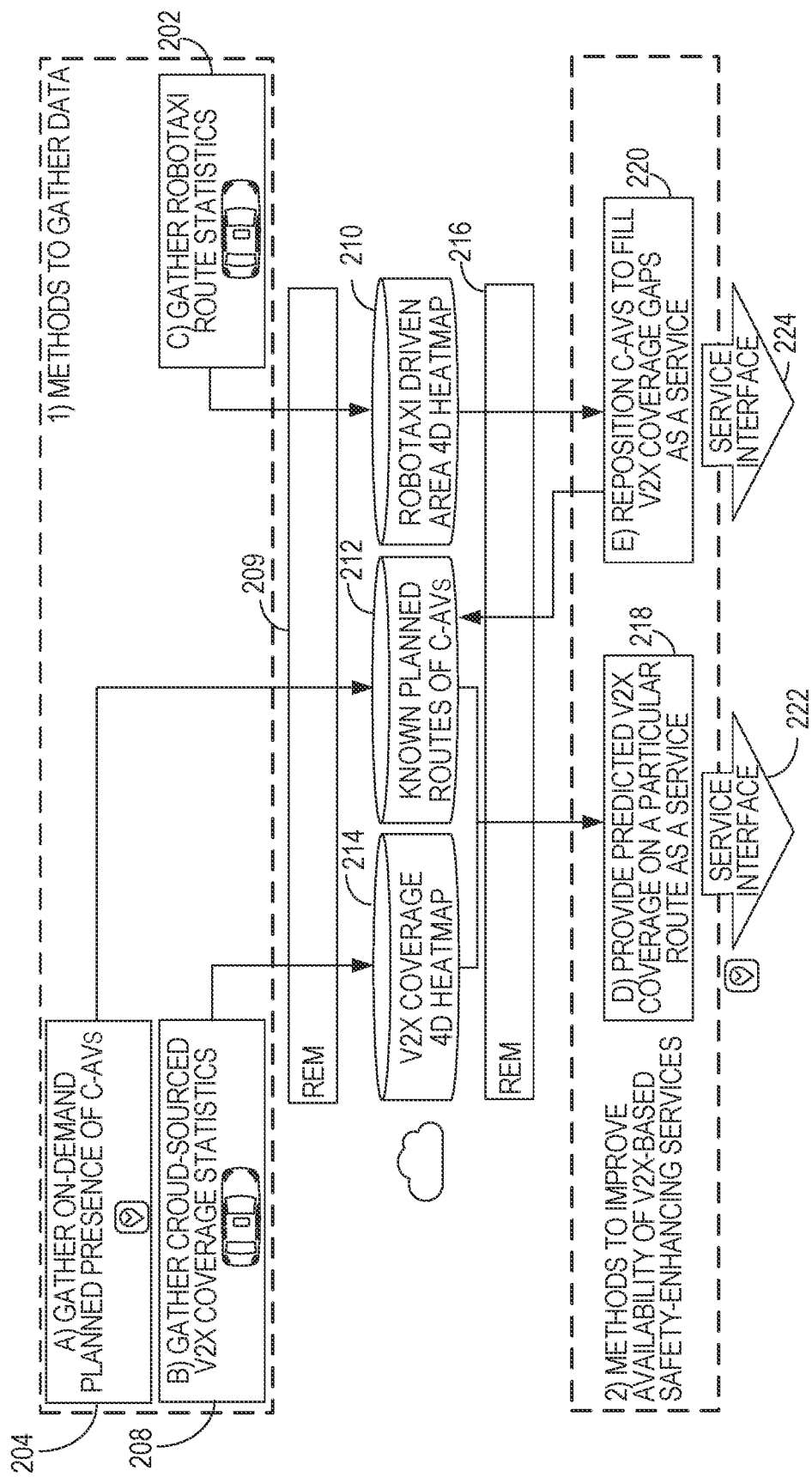
FIG. 2 shows an example data flow diagram illustrating data flow in one or more of the disclosed embodiments.

FIG. 2 shows an example data flow diagram illustrating data flow in one or more of the disclosed embodiments. FIG. 2 shows first data 202 indicating historical routes taken by vehicles with a plurality of regions. First data 202 of FIG. 2 is analogous to first data of FIG. 1, which is graphically illustrated in the first map 102 of FIG. 1. FIG. 2 also shows second data 204 representing a predicted presence of vehicles within a plurality of regions. The second data 204 is analogous, in some embodiments, to second data of FIG. 1, which is graphically depicted in the second map 104 of FIG. 1. FIG. 2 also illustrates third data 208 that indicates historical V2X coverage information within each of the plurality of regions. FIG. 2 illustrates that the first data 202 is used to generate a driven area heatmap 210. Second data 204 is used to generate a datastore of planned routes 212 for C-AVs. Third data 208 is used to generate a V2X coverage 4D heat map 214. The V2X coverage 4D heat map 214 represents V2X coverage density in a plurality of regions across a plurality of different time periods. Each of first data 202, second data 204, and third data 208 are processed by a processing layer 209 to generate each of the driven area heatmap 210, planned routes 212 for C-AVs, and V2X coverage 4D heat map 214.

The V2X coverage 4D heat map 214, in some embodiments, utilizes a quadtree to divide a geographic region into regions or quadrants. Minimum and maximum size of the regions or quadrants are determined by a parameter L that defines a length of a region, which functions to divide the geographic region into a minimum granularity (e.g. the regions should be small enough to provide adequate precision with respect to V2X densities. In some embodiments, the parameter L is between 10 and 400 meters. A maximum value corresponds to an upper bound of a maximum range for V2X communications. A minimum value is defined such that coverage on adjacent routes can be individually identified.

In some embodiments, indications of V2X density in each region are normalized to fall within zero and one (1). In these embodiments, zero indicates no presence of V2X messages were detected within an applicable time period, and one indicates that more than a predefined threshold number of V2X messages were detected, and thus, the V2X message is considered fully functionality at least within the applicable time period.

A second processing layer 216 consumes each of the driven area heatmap 210, planned routes 212 for C-AVs, and V2X coverage 4D heat map 214 to generate predicted V2X coverage 218 on a particular route or service. The second processing layer 216 also generates instructions 220 to reposition C-AVs to fill V2X coverage gaps. Each of the predicted V2X coverage 218 and the instructions for repositioning 220 are made available via web services 222 and 224 respectively.

Figure 3:
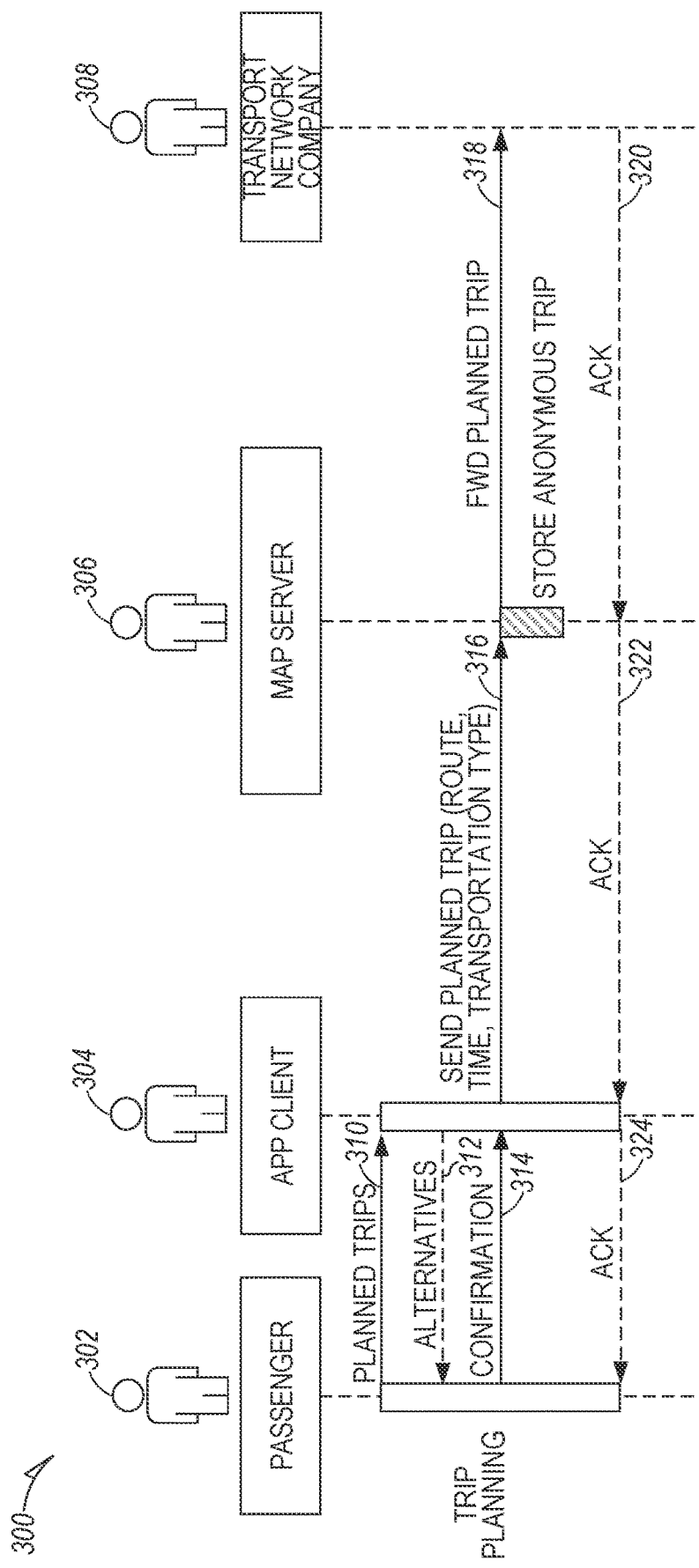
FIG. 3 is a sequence diagram showing actions of participants in a trip planning process according to one or more of the disclosed embodiments.

FIG. 3 is a sequence diagram showing actions of participants in a trip planning process. FIG. 3 shows four actors, a passenger 302, an application client 304, a remuneration server 306, and a transport network company (TNC) 308. The sequence diagram 300 shows that the passenger 302 indicates their planned trips 310 to the application client 304. The application client generates alternative methods 312 of accomplishing the trips and provides those alternative methods to the passenger 302. The passenger 302 indicates a confirmation 314 of at least one of the alternative methods 312. In response to receiving the confirmation 314, the application client 304 sends information 316 relating to the confirmation 314 to the remuneration server 306. The remuneration server 306 stores the trip but anonymizes the information such that an identify of the passenger 302 is not discoverable based on the stored information. The remuneration server 306 then forwards the anonymized trip information as information 318 to the TNC 308. An acknowledgement 320 of the data is then sent by the TNC. The remuneration server 306 sends an acknowledgement 322 to the application client 304. The application client 304 provides an acknowledgement 324 to the passenger 302.

Figure 4:
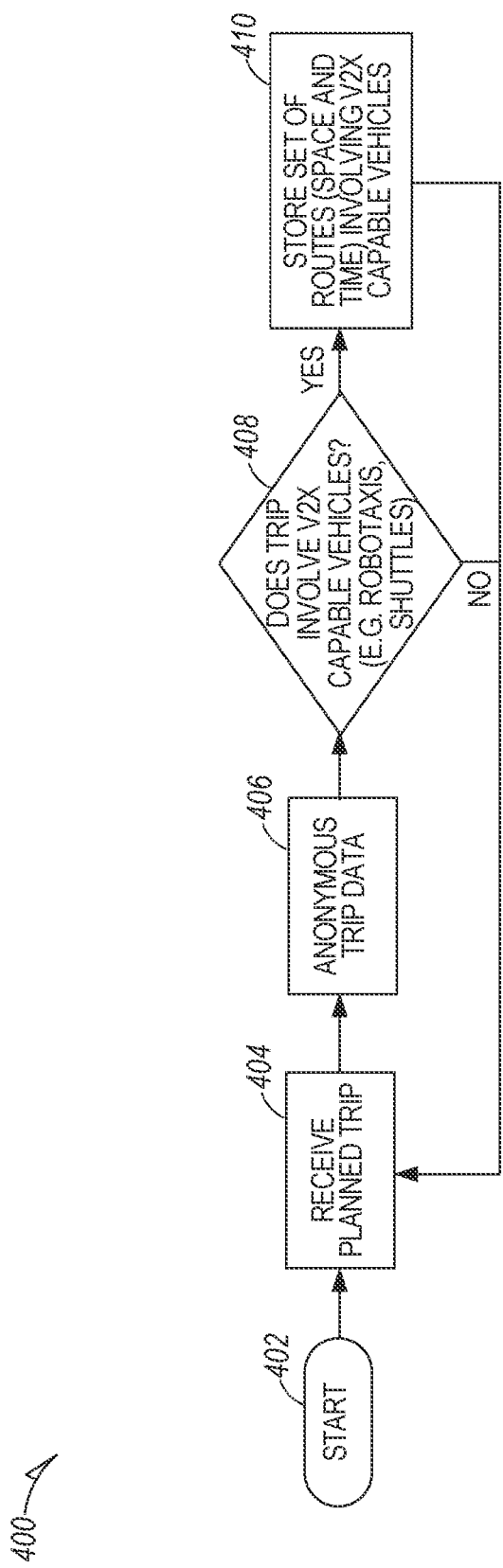
FIG. 4 is a flowchart showing an example method of anonymizing trip information that is performed by one or more of the disclosed embodiments.

FIG. 4 is a flowchart showing an example method of anonymizing trip information that is performed by one or more of the disclosed embodiments. After start operation 402, method 400 moves to operation 404, which receiving information relating to a planned trip. The information includes, for example, an origin of the trip, a destination of the trip, a route taken by the trip, a time of day and date of the trip, or other information. In operation 406, the trip data is anonymized. In other words, any of the information discussed above that could be used to identify one or more passengers of the trip is removed. Anonymization can include the removal of names and specific addresses used during the trip. Specific addresses are modified, in some embodiments, to indicate a location that is not associated with any set of particular individuals (e.g. an intersection, or other non-personal location). Decision operation 408 determines whether the trip includes a V2X capable vehicle. If it does not, the trip information is discarded or otherwise ignored. Processing then returns to operation 404. Otherwise, method 400 moves from decision operation 408 to operation 410, where a set of routes includes V2X capable vehicles are stored.

Figure 5:
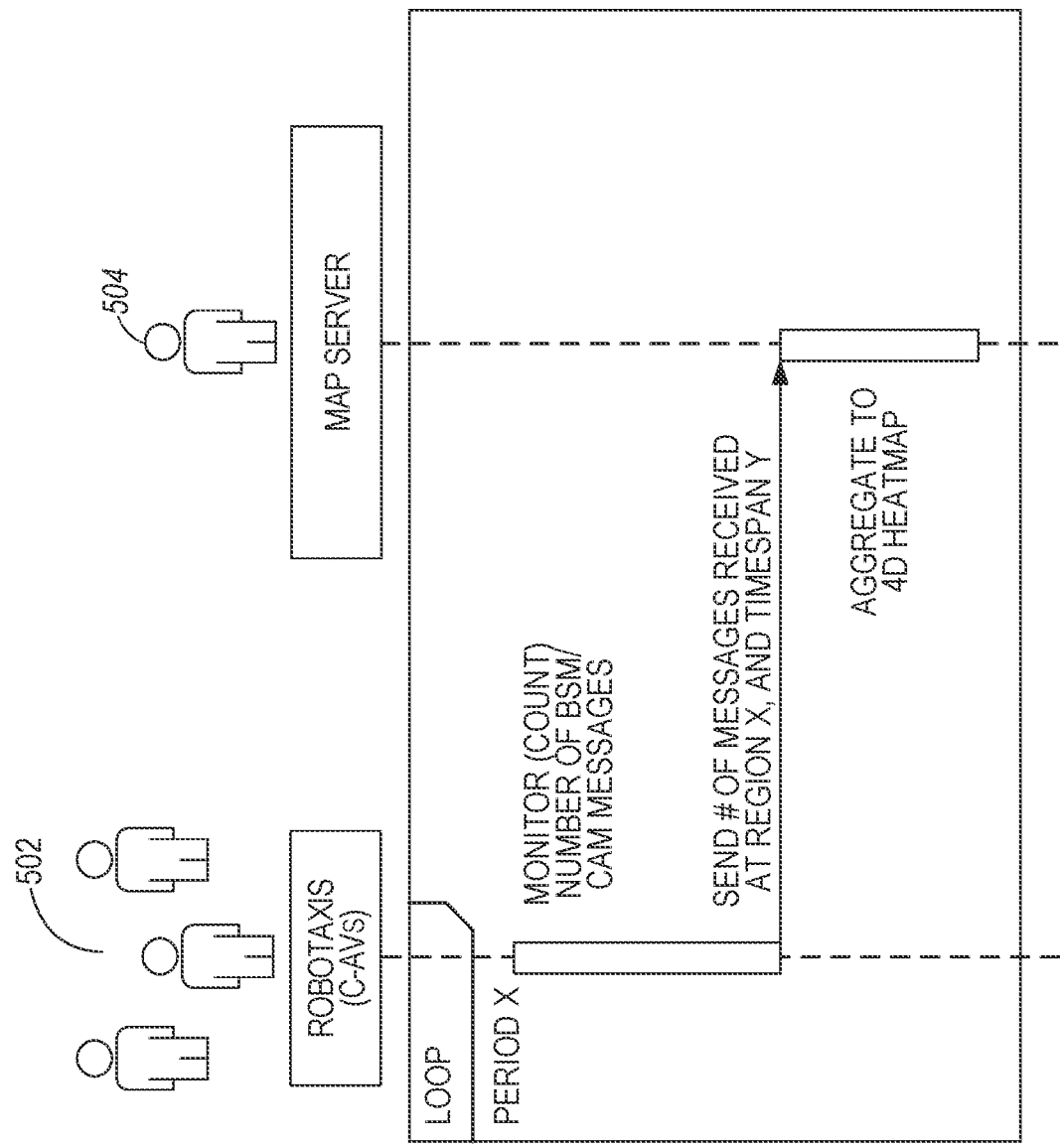
FIG. 5 is a sequence diagram illustrating example generation of a V2X availability heat map in one or more of the disclosed embodiments.

FIG. 5 is a sequence diagram illustrating example generation of a V2X availability heat map in one or more embodiments. FIG. 5 shows two actors, those being V2X enabled vehicles 502 and a renumeration server 504. The V2X enabled vehicles 502 monitor or court a number of V2X messages (e.g. BSM and/or CAM messages) received while the vehicles traverse each of a plurality of regions and across a plurality of different time periods. This information is then provided to the renumeration server 504, which generates the heat map.

Figure 6A:
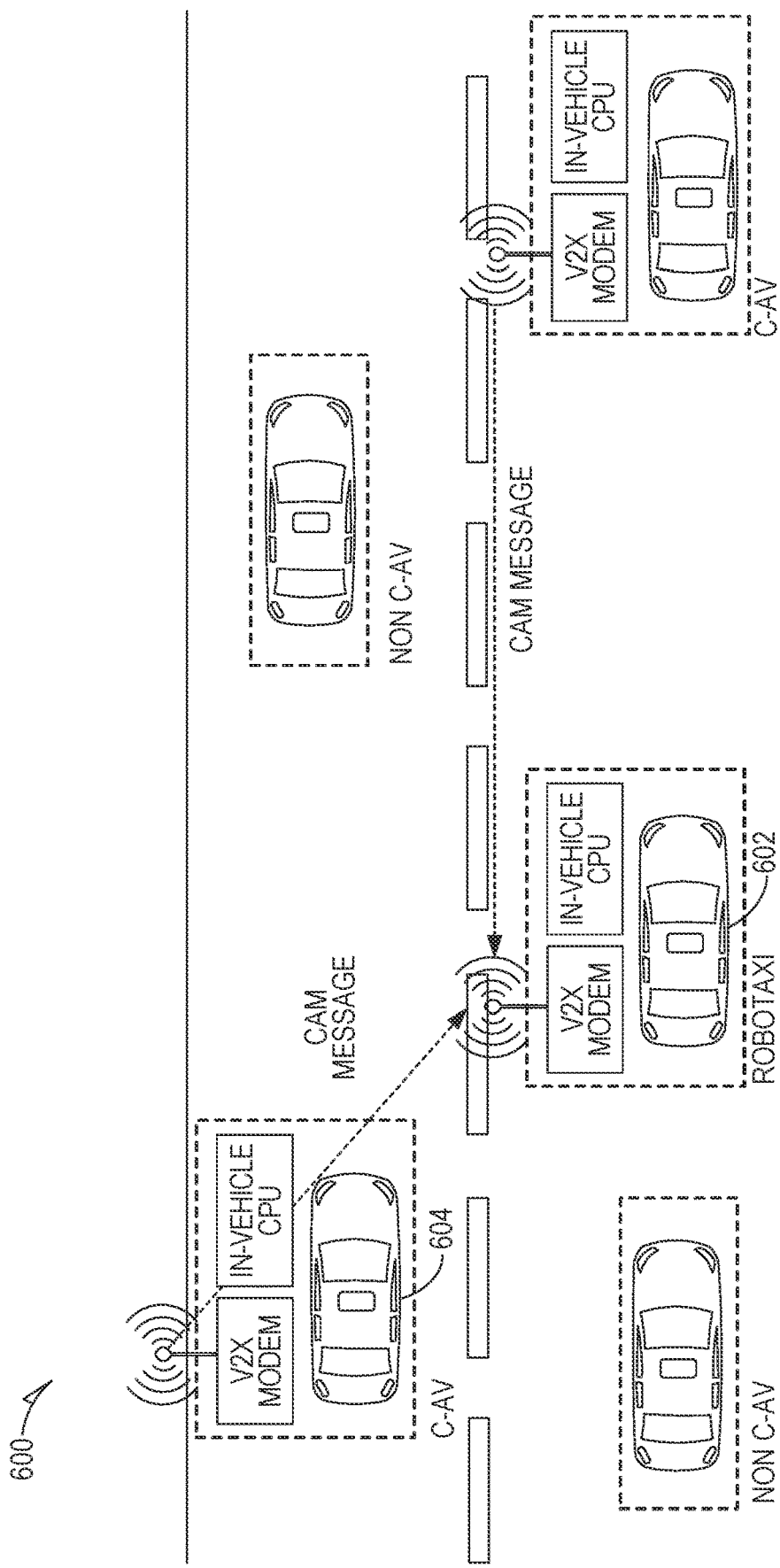
FIG. 6A illustrates V2X enabled vehicles communicating on a roadway according to one or more of the disclosed embodiments.

FIG. 6A is a diagram 600 illustrating V2X enabled vehicles communicating on a roadway. Some of the disclosed embodiments utilize vehicles that are configured to collect statistical information on V2X messages received by the vehicles as they travel. The vehicles are configured to count a number of V2X messages received within a plurality of regions. Alternatively, vehicles are configured to record reception of a V2X message, a source vehicle of the V2X message, and a location of the receiving vehicle when the V2X message is received. This information is then aggregated to generate the third data 208 discussed above with respect to FIG. 2 and/or the fourth data graphically depicted in the fourth map 108 discussed above with respect to FIG. 1. FIG. 6A illustrates a first V2X enabled vehicle 602 in communication with a second V2X enabled vehicle 604.

The relative density of a V2X network within a plurality of regions is determined by at least some of the disclosed embodiments by aggregating an amount of received V2X messages that are received from within the region during a predefined period of elapsed time. Because the number of messages can, in some embodiments, vary in different positions within the region, some embodiments average or aggregate the number of messages received at a plurality of positions within the region to determine a regions V2X density.

In some embodiments, an industry standard mandates transmission of V2X messages by a V2X enabled vehicle about every 100 milliseconds (ms). In some embodiments, these messages are cellular vehicle to everything (CV2X) or DSRC messages, corresponding to a European Telecommunications Standards Institute (ETSI) cooperative awareness messages (CAM) standard or a society of automotive engineers (SAE) Basic Safety Messages (BSM) standard respectively.

The number of CAM or BSM messages received at a particular point in space-time are aggregated, in some embodiments, into a 4D heatmap (e.g. V2X coverage 4D heat map 214 discussed above) to consolidate the observations.

Figure 6B:
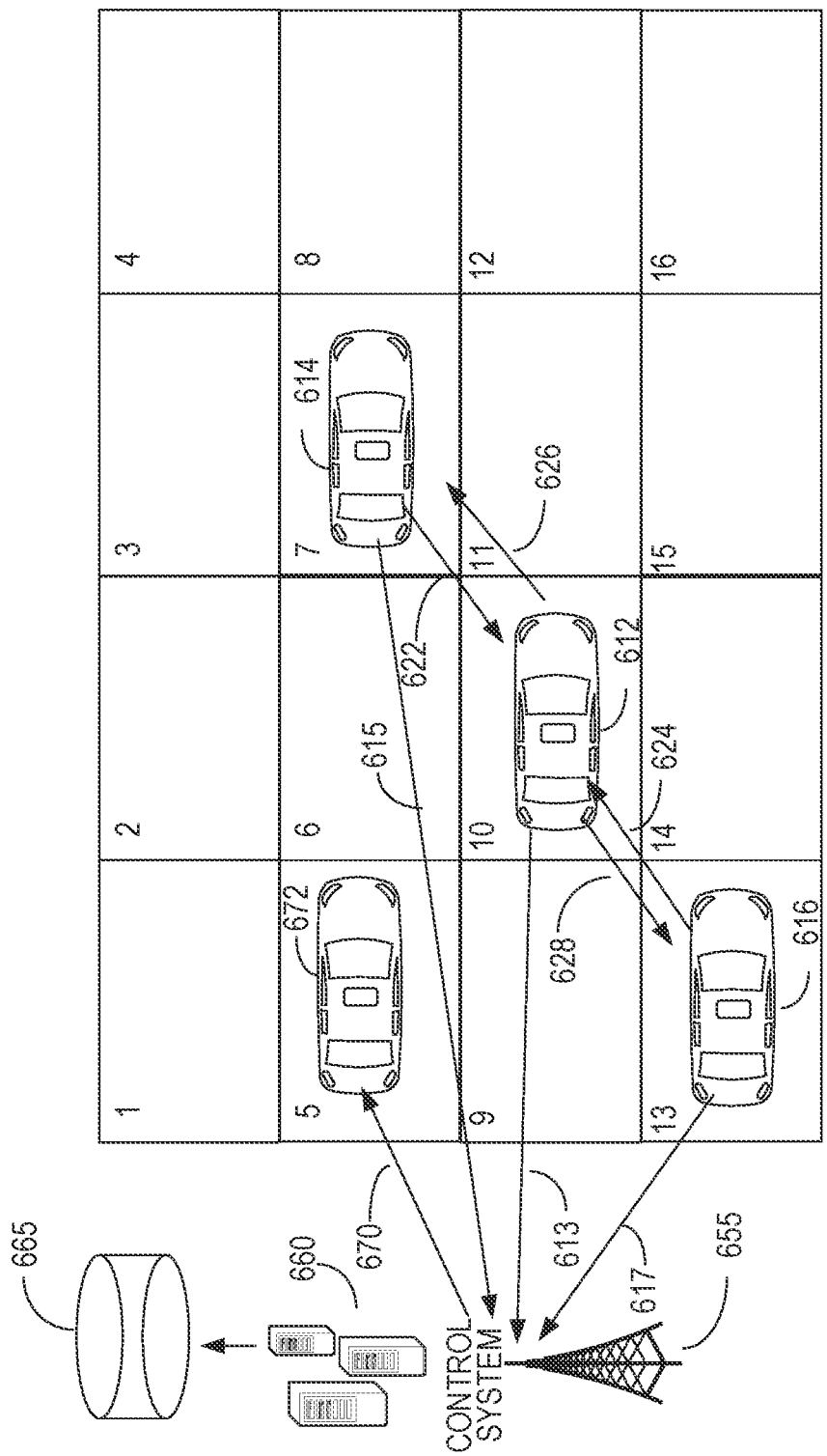
FIG. 6B illustrates V2X message data collection within a plurality of regions according to one or more of the disclosed embodiments.

FIG. 6B shows V2X message data collection within a plurality of regions. FIG. 6B shows three V2X enabled vehicles, a vehicle 612, a vehicle 614, and a vehicle 616. FIG. 6B shows the vehicle 612 receiving two V2X messages while present in the region labeled "10". A first message 622 is generated by the vehicle 614 and received by the vehicle 612. A second message 624 is generated by the vehicle 616 and received by the vehicle 612. Thus, in this simple example, the vehicle 612 reports, via a reporting message 613 to a control system 660 via an antenna 655, in some embodiments, that it received two V2X messages while present in region "10" during a time period when the messages were received. Vehicle 614 receives a V2X message 626 from the vehicle 612 during the same time period. Thus, vehicle 614 reports, via a reporting message 615 to the control system 660, and via the antenna 655, in some embodiments, that it received a single V2X message while present in region "7" during the time period. Vehicle 616 also receives a V2X message 628 from the vehicle 612 while present in region "13." Thus, vehicle 616 reports, via a reporting message 617, to the control system 660 and via antenna 655, that a single message was received in region 13 during the time period. Note that V2X message 626 and V2X message 628 are the same message transmitted by the vehicle 612 in some embodiments, but that single message is counted twice, once when received by vehicle 614 and once when received by vehicle 616. Whether a single message is received by multiple vehicles will depend on, for example, a number of vehicles within a transmission range of the transmitting vehicle when the message is transmitted. The control system 660 stores information from each of the reporting messages 613, 615, and 617, in the data store 665. For example, information included in the reporting messages 613, 615, and 617 is used, in some embodiments, to populate the V2X reporting table 710, discussed further below with respect to FIG. 7.

FIG. 6B also shows the control system 660 transmitting a routing message 670 to another vehicle 672. In some embodiments, the control system determines a route for the vehicle 672 based on the reporting messages 613, 615, or 617. For example, in some embodiments, the control system 660 generates data analogous to first data, second data, third data, and/or fourth data, discussed above with respect to FIG. 1, based on one or more of the reporting messages 613, 615, or 617. Based on this generated data, the control system 660 determines a high priority set of gaps in V2X coverage. The control system 660 then determines a route for the vehicle 672 based on the high priority set of gaps. For example, in some embodiments, the control system 660 determines a route for the vehicle 672 that avoids the gaps, and sends the route to the vehicle 672 via the routing message 670. In some other embodiments, the control system 660 routes the vehicle 672 into one or more of the high priority set of gaps so as to intentionally augment V2X coverage within one or more of the high priority set of gaps. This route is also specified in the routing message 670 in these embodiments. Thus, the control system 660 assigns a route to a vehicle, in some embodiments, by transmitting the routing message 670 to the vehicle 672.

Figure 6C:
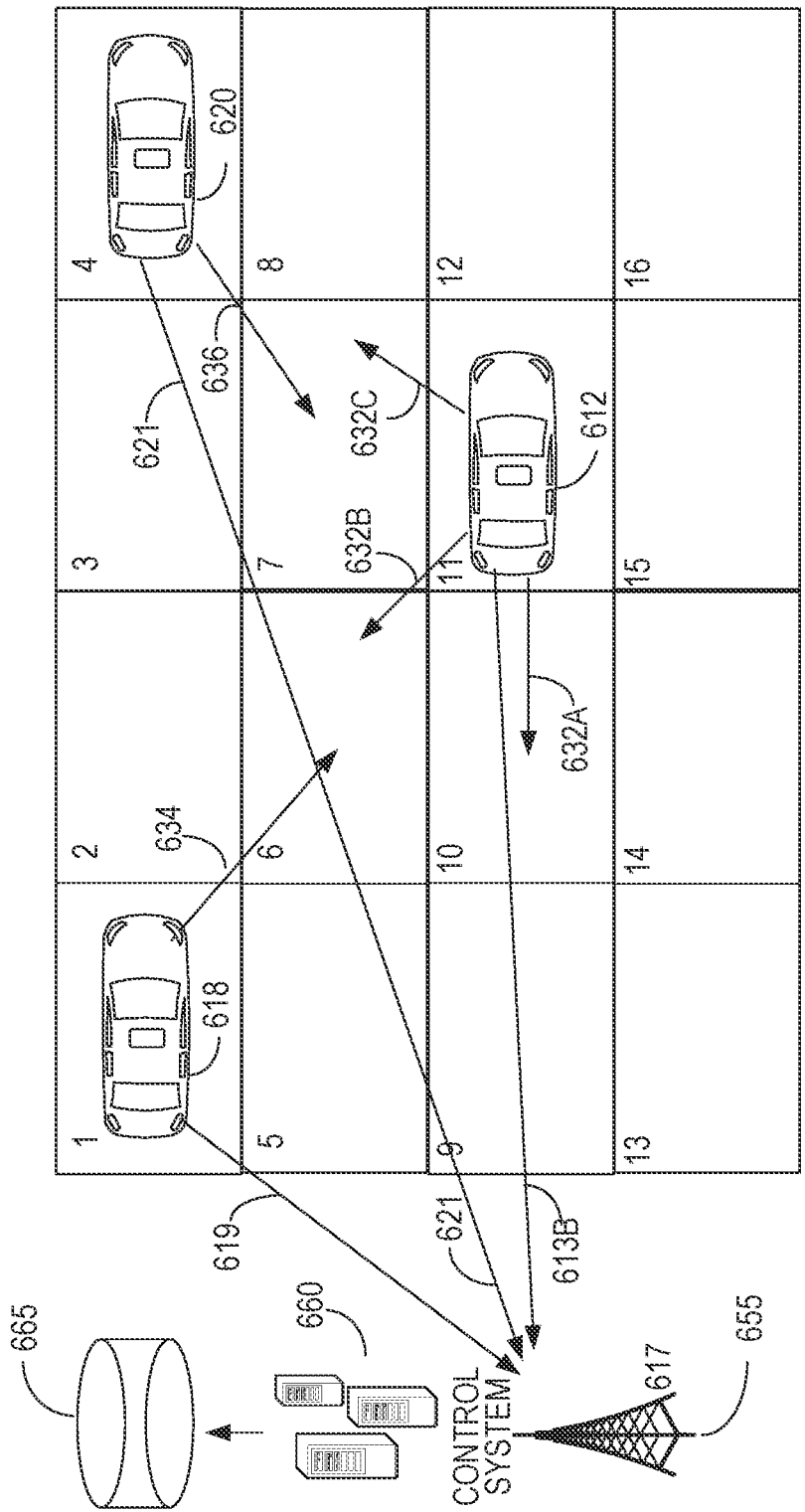
FIG. 6C illustrates how proximity of a V2X enabled vehicle to other V2X enabled vehicles affects V2X message data collection within a plurality of regions according to one or more of the disclosed embodiments.

FIG. 6C illustrates how proximity of a V2X enabled vehicle to other V2X enabled vehicles affects V2X message data collection within a plurality of regions according to one or more of the disclosed embodiments. In particular, FIG. 6C shows the vehicle 612 in region "11". FIG. 6C also shows a vehicle 618 present in region "1" and a vehicle 620 present in region "4". Vehicle 612 transmits a V2X message, shown as message 632A, message 632B, and message 632C of FIG. 6C, which, based on a transmit power of the message, has a range that makes it capable of being received in at least regions 6, 7, 8, 10, 12, 14, 15, and 16. However, no vehicles are present in those regions in the example of FIG. 6C. While vehicle 618 is present in region "1" and vehicle 620 is present in region "4", they are out of range of the V2X messages 632A-632C, and thus do not count the messages 632A-632C in reporting messages 619 and 621 respectively.

Vehicle 618 also generates a V2X message 634. However, as no other vehicle is within range of the V2X message 634, the V2X message 634 is not counted in any other vehicles count of V2X messages. Similarly, vehicle 620 transmits a V2X message 636, which is also out of range of any other vehicle and thus its transmission is not reported to the control system 660 via reporting messages 619 or 613B.

Figure 6D:
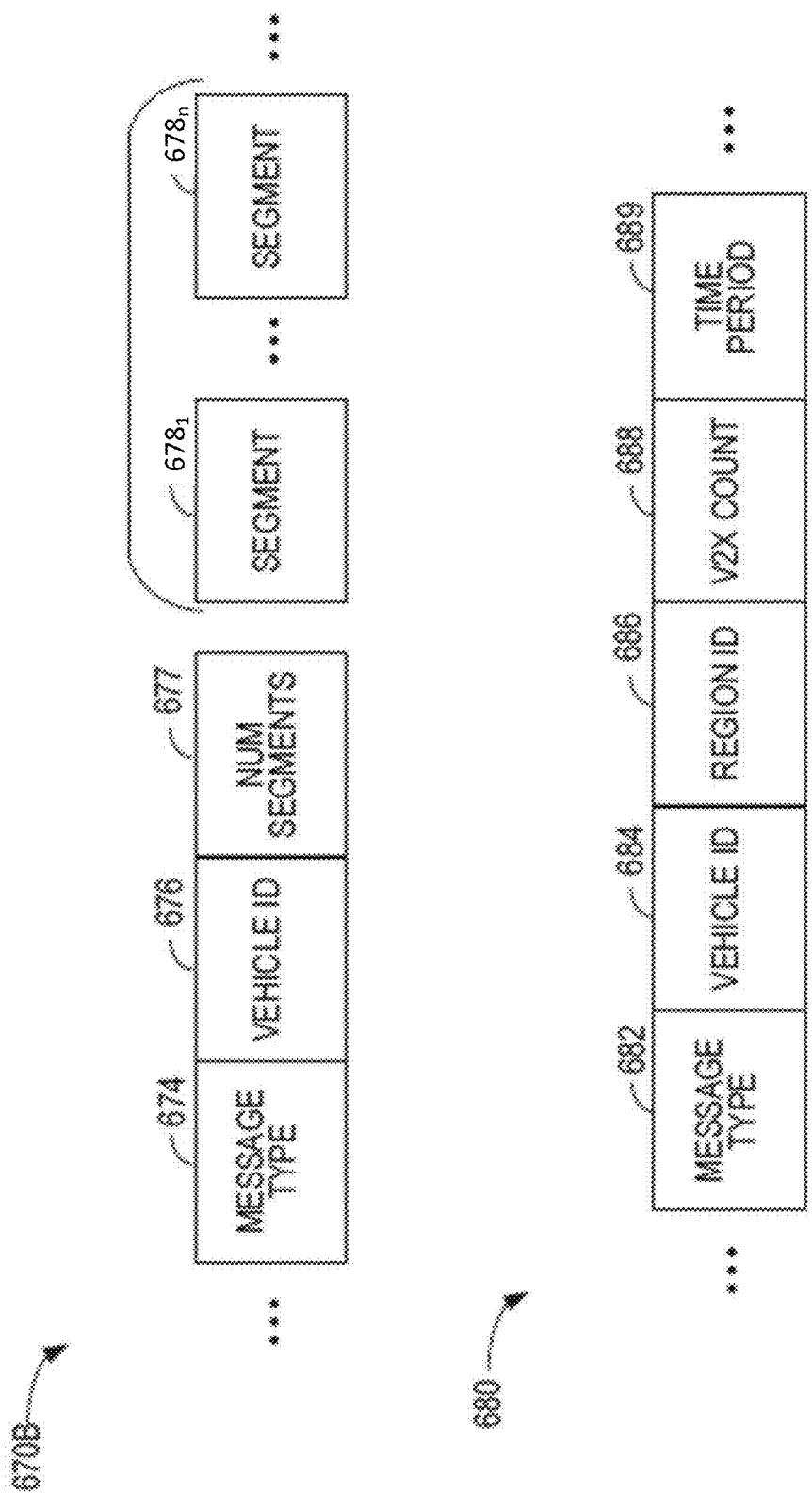
FIG. 6D illustrates an example reporting message portion format according to one or more of the disclosed embodiments.

FIG. 6D shows an example routing message format and an example reporting message portion format. The example routing message portion 670B forms at least a portion of the routing message 670, discussed above with respect to FIG. 6B. The routing message portion 670B includes a message type field 674, vehicle identifier field 676, number of routing segments field 677, and a variable number of routing segment fields, illustrated as routing segment fields $678_1$ . . . $678_n$. The message type field 674 identifies, via a predefined constant, the routing message portion 670B as a routing message. The vehicle identifier field 676 identifies a vehicle to which the routing message is intended. The number of segments field 677 identifies a number of segments in the route being assigned to the vehicle by the routing message portion 670B. The routing segment fields $678_1$ . . . $678_n$ define segments of the route. In some embodiments, the routing message portion references one or more of the data structures discussed below with respect to FIG. 7. For example, the routing message portion references, in some embodiments, the route segment table 730 and/or rows of the route segment table 730.

The example reporting message portion 680 is included in, in some example embodiments, a portion of any one or more of the reporting messages 613, 615, 617, 613B, 619, or 621 discussed above. The example reporting message portion 680 includes a message type field 682, vehicle identifier field 684, region identifier field 686, V2X count field 688, and a time period field 689. The message type field 682 indicates, via a predefined constant, a type of the message portion 680 (e.g. reporting message). The vehicle identifier field 684 uniquely identifies a vehicle generating the message (e.g. identifies one of vehicles 612, 616, or 614 in the example of FIG. 6B). The region identifier 686 uniquely identifies a region for which the V2X count provided by V2X count field 688 applies. Thus, for example, the region identifier field 686 identifies region "10" when the vehicle 612 transmits the reporting message 613. The time period field 689 indicates a time period during which the V2X count of V2X count field 688 is applicable. Note that some embodiments utilize information provided in the example message portion 680 to populate the V2X reporting table 710, discussed below.

Figure 7:
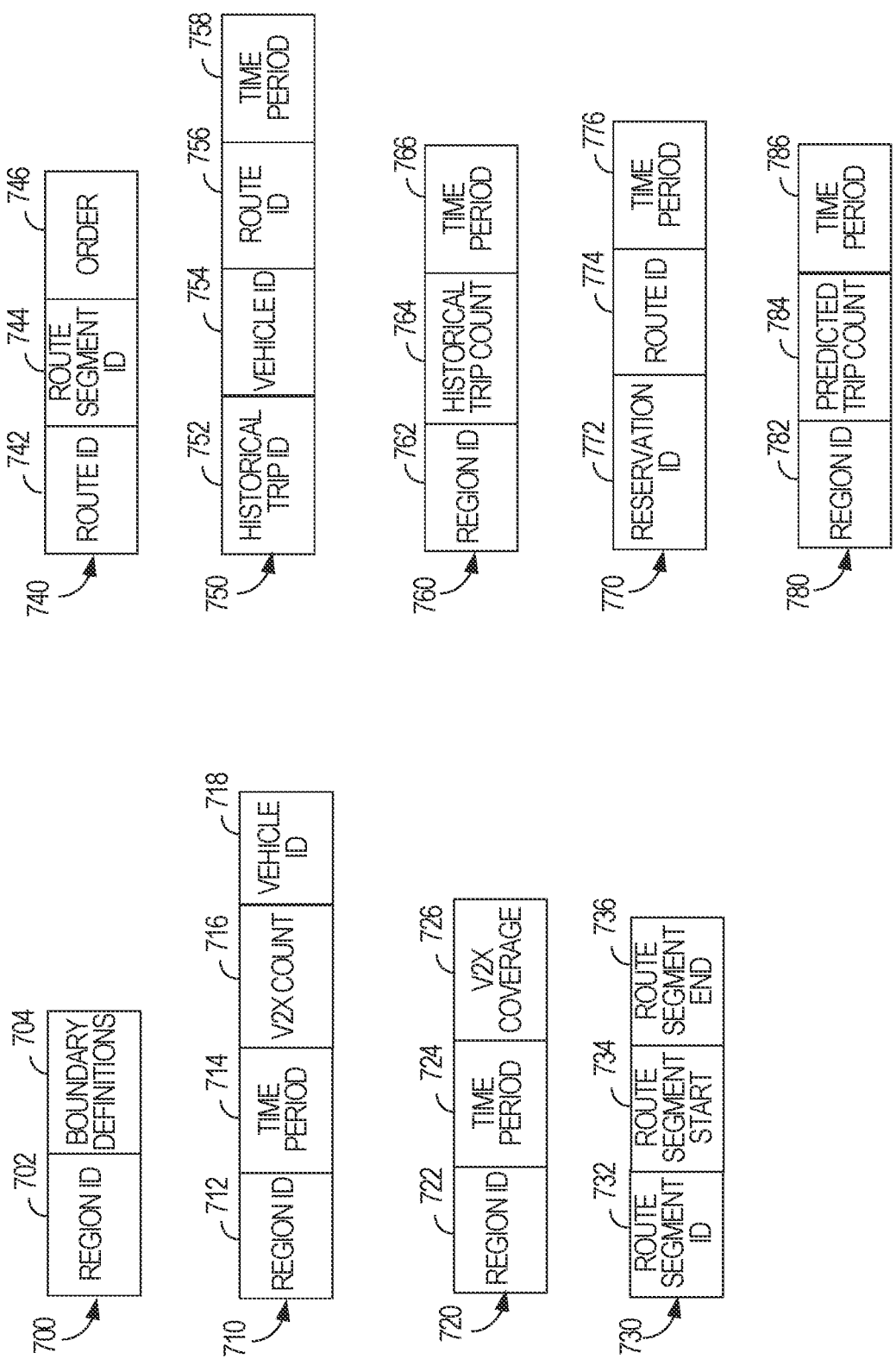
FIG. 7 illustrates example data structures implemented in one or more of the disclosed embodiments.

FIG. 7 shows example data structures implemented in one or more of the disclosed embodiments. While the example data structures discussed below with respect to FIG. 7 are discussed as rows of relational database tables, the disclosed embodiments contemplate the use of a variety of different data structure architectures and should be considered to be limited to the examples of FIG. 7.

FIG. 7 shows a region table 700, V2X reporting table 710, V2X heat map table 720, route segment table 730, route table 740, historical trip table 750, a historical trip heat map table 760, a reservations table 770, and a predicted trip heat map table 780. The region table 700 includes a region identifier field 702 and a boundary definitions field 704. The region identifier field 702 uniquely identifies a particular region. The boundary definitions field 704 defines geographic boundaries of the region. For example, in some embodiments, the boundary definitions field 704 defines coordinates of two corners of a square region, or three corners of a rectangular region.

The V2X reporting table 710 stores information received from vehicles regarding V2X messages. The V2X reporting table 710 includes a region identifier field 712, time period field 714, V2X message count field 716, and a vehicle identifier field 718. The region identifier field 712 uniquely identifies a region, and is cross referenceable with at least the region identifier field 702. The time period field 714 identifies a time period for which the V2C message count of V2X message count field 716 is applicable. Various embodiments define varies lengths of time periods. For example, the time period has a length of 1 minute, 5 minutes, 10 minutes, 30 minutes, or 60 limits in various embodiments, but other embodiments use a different length of time period. The vehicle identifier field 718 uniquely identifies a vehicle that reported the data represented by a particular row of the V2X reporting table 710.

The V2X heat map table 720 includes a region identifier field 722, time period field 724, and a V2X coverage field 726. The region identifier field 722 uniquely identifies a region, and is cross referenceable with any of the region identifier field 702 or region identifier field 712. The time period field 724 identifies a time period during which the V2X coverage information of the V2X coverage field 726 applies. As discussed above with respect to the time period field 714, various embodiments define time periods of different lengths, including one minute, five minutes, or other time period lengths. In some embodiments, the time period is identifier by specifying a starting time of the time period, and the time period length is defined/stored separately or is a predefined constant. In some embodiments, data analogous to that discussed above with respect to the V2X heat map table 720 is used to generate FIG. 1's fourth data, graphically depicted as the fourth map 108 of FIG. 1.

The route segment table 730 includes a route segment identifier field 732, route segment start field 734, and a route segment end field 736. The route segment identifier field 732 uniquely identifies a route segment. The route segment start field 734 defines a starting location of the segment (e.g. via latitude/longitude coordinates). The route segment end field 736 defines an ending location of the segment (e.g. via latitude/longitude coordinates).

The route table 740 includes a route identifier field 742, route segment identifier field 744, and an order field 746. The route identifier field 742 uniquely identifies a route. The route segment identifier field 744 identifies a route segment included in the route. The order field 746 indicates an order of the identified route segment (via route segment identifier field 744) in the route.

The historical trip table 750 includes a trip identifier field 752, vehicle identifier field 754, route identifier field 756, and a time period field 758. The trip identifier field 752 uniquely identifies a vehicle trip. The vehicle identifier field 754 identifies a vehicle making the trip. The route identifier field 756 identifies a route in the route table 740 used for the trip. The time period field 758 identifies a time period when the trip was performed.

The historical trip heat map table 760 includes a region identifier field 762, historical trip count field 764 and a time period field 766. The region identifier field 762 uniquely identifies a region, and is cross referenceable with the region identifier field discussed above. The historical trip count field 764 indicates a number of trips that included the identifier region (via region identifier field 762) during a time period identified by the time period field 766. In some embodiments, data analogous to that discussed above with respect to the historical trip heat map table 760 is used to generate first data of FIG. 1, graphically illustrated via the first map 102.

The reservations table 770 includes a reservation identifier field 772, route identifier field 774, and a time period field 776. In some embodiments, data analogous to that discussed below with respect to the reservations table 770 is used to generate the second data, graphically illustrated via the second map 104, discussed above with respect to FIG. 1.

The reservations table 770 can include additional fields in some embodiments, but are not described here. The reservation identifier field 772 uniquely identifies a reservation for vehicle travel. The route identifier field 774 identifies a route to be performed for the reservation. The route identifier field 774 is cross referenceable with the route identifier field 742, discussed above. The time period field 776 identifies a time period in which the reservation requests the route to be performed. The time period field 776 has a structure similar, in some embodiments, to one or more of the other time period fields discussed above.

The predicted trip heat map table 780 includes a region identifier field 782, predicted trip count field 784 and a time period field 786. The region identifier field 782 uniquely identifies a region, and is cross referenceable with the region identifier field discussed above. The predicted trip count field 784 indicates a number of predicted trips that will include the identifier region (via region identifier field 782) during a time period identified by the time period field 786. In some embodiments, data analogous to that stored in the reservations table 770 is used to generate the predicted trip heat map table 780. For example, based on a reservation, the disclosed embodiments can identify one or more regions that will be visited when performing the trip corresponding to the reservation during the given time period (indicated via time period field 776). By aggregating the regions visited as a result of the reservations during a time period, some of the disclosed embodiments predict a trip count in each region during the time period, thereby generating the data represented by the predicted trip heat map table 780. In some embodiments, data analogous to that discussed above with respect to the predicted trip heat map table 780 is used to generate the second data, graphically illustrated via the second map 104, discussed above with respect to FIG. 1.

Figure 8:
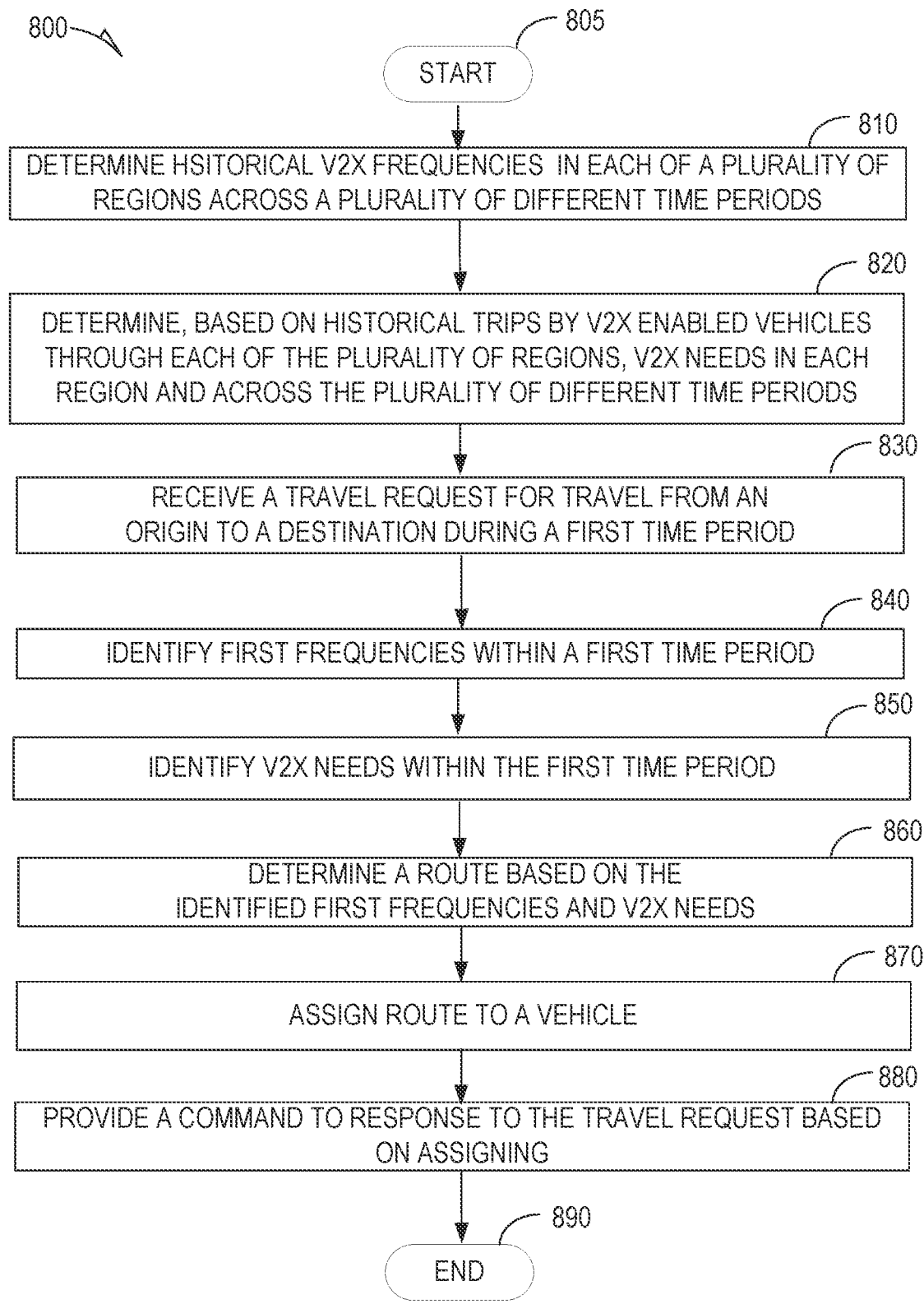
FIG. 8 is a flowchart of a method for assigning a vehicle to a route according to one or more of the disclosed embodiments.

FIG. 8 is a flowchart of a method for assigning a vehicle to a route. In some embodiments, one or more of the operations discussed below with respect to FIG. 8 and the method 800 are performed by hardware processing circuitry. For example, in some embodiments, instructions (e.g. instructions 924 below) stored in a memory (e.g. 904 and/or 906 below) configure one or more hardware processors (e.g. hardware processor 902 below) to perform the one or more operations discussed below with respect to FIG. 8. In some embodiments, the method 800 discussed below is performed by the control system 660.

After start operation 805, the method 800 moves to operation 810, where historical V2X frequencies are determined in each of a plurality of regions. In some embodiments, the historical V2X frequencies are also determined across a plurality of different time periods. For example, as discussed above with respect to FIG. 6A, some of the disclosed embodiments collect information from a plurality of V2X enabled vehicles. The information indicates a count or other numericity information indicating V2X messages each vehicle received in a plurality of different regions during particular time periods. Some embodiments store the information collected from each vehicle in a data structure analogous to the V2X reporting table 710, discussed above with respect to FIG. 7. Operation 810 then aggregates this data to determine a measurement of V2X density in each of the plurality of regions during the plurality of different time periods. For example, some embodiments utilize data analogous to that stored in the V2X reporting table 710 to generate data similar to that stored in the V2X heat map table 720. As discussed above, some embodiments represent V2X coverage in each region based on a normalized value between zero and one. Some embodiments consider this aggregated information a "heat map," such as that graphically illustrated by the fourth map 108 of FIG. 1.

In operation 820, historical trips by vehicles (e.g. V2X-enabled vehicles) through each of the plurality of regions are determined. In some embodiments of operation 820, the number of trips through each region is determined for each of a plurality of historical time periods also. In some embodiments, a frequency of trips through each region is determined. E.g. in some embodiments, the number of trip is normalized by some predefined elapsed time.

Based on the historical number of trips (or a frequency of historical trips) through each region and for each historical time period, a need for V2X communication or coverage in each region during one or more prospective time periods are determined. This need can be expressed as a need density or need frequency. In some embodiments, a prediction of trips during a prospective time period and through one or more regions is based on historical trips during an analogous historical time period through the same one or more regions. For example, historical trips on Fridays from 5 PM to 8 PM are used, in some embodiments, to predict a number of trips during a prospective time period occurring on a Friday between 5 PM and 8 PM. Some embodiments perform estimates or predictions of trip volumes during a plurality of prospective time periods.

Some embodiments maintain or store data analogous to that described above with respect to the historical trip table 750, which stores information of historical trips, the routes used by the trips (e.g. via route identifier 756), and the time period when the trip occurred (e.g. via time period field 758). A set of regions traversed by each trip is then obtained based on the route information of the historical trips. For example, some embodiments map each of the route identifiers of each trip (e.g. via route identifier field 756) to one or more regions by identifying segments of each route (e.g. via route table 740 and route segment table 730), and then which regions are traversed by each route segment (e.g. using the route segment start field 734 and route segment end field 736 to identify overlap between the route segment and the region boundaries defined by boundary definitions field 704 of each region of a plurality of regions.

In operation 830, a travel request is received for travel from an origin to a destination during a prospective time period. In some embodiments, the travel request is received from a passenger, such as the passenger 302 of FIG. 3. In some embodiments, the travel request indicates an origin and/or destination of a vehicle trip requested by the passenger. In some embodiments, the travel request indicates a prospective time period when the passenger requests the travel to occur (e.g. indicated by time period field 776 in some embodiments).

In operation 840, first V2X densities or frequencies for each of the plurality of regions, and within the prospective time period are determined in response to the travel request. For example, some embodiments filter data analogous to data stored in the V2X heat map table 720 to identify only V2X coverage information (e.g. via V2X coverage field 726) applicable to the prospective time period (e.g. based on time periods indicated in the time period field 724).

In operation 850, V2X needs in each of the plurality of regions and within the prospective time period are identified. For example, in some embodiments, data analogous to that described above with respect to the historical trip heat map table 760 is filtered to identify trip counts in regions applicable to the prospective time period (e.g. filtering based on time periods analogous to the prospective time period via the time period field 766 to identify trip counts of historical trip count field 764). These trip counts represent a need for V2X coverage in each region traversed by the trips in some embodiments, and during time periods analogous to that of the prospective time period.

Some embodiments further consider existing reservations to determine a V2X need in each of the plurality of regions during the prospective time period. For example, as discussed above with respect to the reservations table 770, some embodiments store data that indicates reservations for travel during one or more time periods, including the prospective time period. From this reservation information, a predicted trip count in each region can be determined. This predicted trip count (e.g. predicted trip count field 784) considers, in various aspects, one or more of the historical trip count in the region during an analogous time period (considering one or more of time of day, date, date of week, or seasonality), and any existing reservations that will cause trips to occur within each of the plurality of regions (e.g. derived from data analogous to the reservations table 770) during the prospective time period. Some embodiments determined a V2X need in a manner consistent with the description of FIG. 1 above, and specifically third data and the third map 106, discussed above with respect to FIG. 1.

In operation 860, a route is determined based on the identified historical frequencies and the V2X gaps in each of the plurality of regions. In some embodiments, those regions having relatively low V2X densities or frequencies are avoided or excluded when determining the route. In some embodiments, a plurality of routes for a plurality of trips are determined collectively, such that each route may possibly benefit from a presence of other vehicles in a region such that adequate V2X coverage can be provided along a route. Adequate V2X coverage in this context is measured at least in some embodiments, by a number of V2X messages received by a receiver positioned within the region during a predefined time period. If the number of messages is above a predefined threshold, or otherwise meets a predefined criterion, then the V2X coverage is deemed adequate. Otherwise, the V2X coverage is inadequate in these embodiments. In some embodiments, multiple measurements by multiple receivers within a single region are obtained. The number of messages received by each of these multiple receiver is averaged, or a median value obtained, and then the average or median value is compared to the predefined threshold, or otherwise evaluated by a criterion, with adequate coverage determined if the average or median value is above the predefined threshold or the criterion is met.

Thus, a route that has an indicted a historical frequency below an acceptable level, might be augmented via additional scheduled trips such that that route's predicted V2X density during the prospective time period is increased, and the route can be utilized for trips scheduled during the prospective time period.

In operation 870, the determined route is assigned to a vehicle. In some embodiments, the assignment of the route to the vehicle is based on a proximity of the vehicle to a starting or origin location of the route. Assigning the route to the vehicle can cause, in at least some embodiments, for the vehicle to begin traveling to an origin point of the route.

In operation 880, a command to respond to the travel request is provided. For example, in some embodiments, a device performing the method 800 indicates to another device, that a response to the travel request is to be generated. In some other embodiments, operation 880 includes responding, by the device performing the method 800, to the travel request. In some embodiments, the response is generated based on the assigning. For example, in some embodiments, the response indicates that a vehicle has been assigned, an estimated time of arrival at the origin location, a type of the vehicle, vehicle color, or driver information (if any). After operation 880 completes, the method 800 moves to end operation 890.

Figure 9:
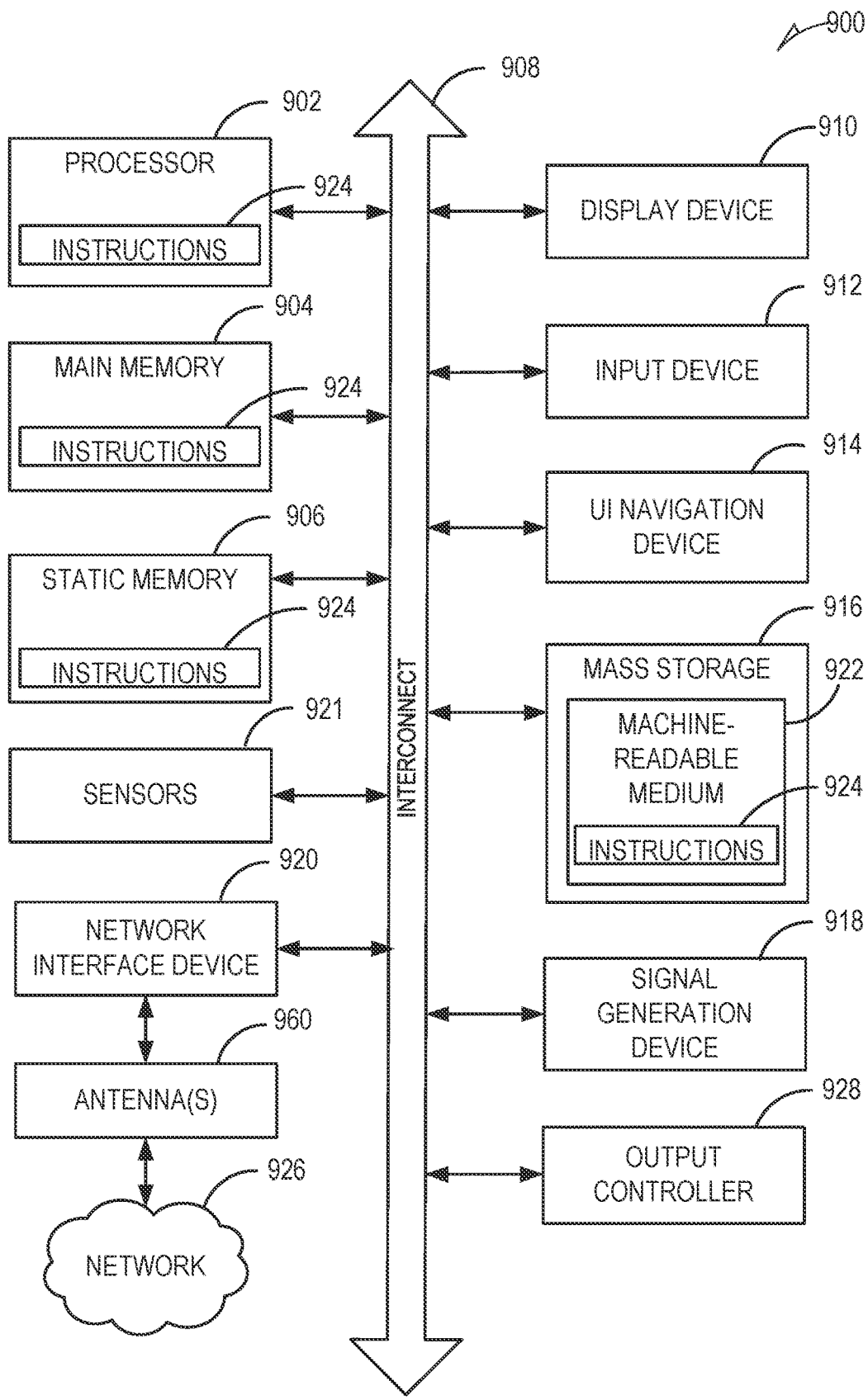
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink 908 (e.g., bus). In some embodiments, the control system 660 implements one or more instances of the machine 900 to perform one or more functions of the method 800 described above.

Specific examples of main memory 904 include Random Access Memory (RAM), and semiconductor memory devices, which may include, in some embodiments, storage locations in semiconductors such as registers. Specific examples of static memory 906 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 900 may further include a display device 910, an input device 912 (e.g., a keyboard), and a user interface (UI) navigation device 914 (e.g., a mouse). In an example, the display device 910, input device 912 and UI navigation device 914 may be a touch screen display. The machine 900 may additionally include a mass storage device 916 (e.g., drive unit), a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 902 and/or instructions 924 may comprise processing circuitry and/or transceiver circuitry.

The mass storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the mass storage device 916 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 922 is illustrated as a single medium, the term "machine readable medium" may include a single medium or multiple media (e.g., a centralized or distributed database, and/or associated caches and servers) configured to store the one or more instructions 924.

An apparatus of the machine 900 may be one or more of a hardware processor 902 (e.g., a central processing unit (CPU), a graphics processing unit (GPU), a hardware processor core, or any combination thereof), a main memory 904 and a static memory 906, sensors 921, network interface device 920, antennas 960, a display device 910, an input device 912, a UI navigation device 914, a mass storage device 916, instructions 924, a signal generation device 918, and an output controller 928. The apparatus may be configured to perform one or more of the methods and/or operations disclosed herein. The apparatus may be intended as a component of the machine 900 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRAWAN® LPWAN network standards), IEEE 802.15.4 family of standards, a Long Term Evolution (LTE)

family of standards, a Universal Mobile Telecommunications System (UMTS) family of standards, peer-to-peer (P2P) networks, satellite communication networks, among others.

In an example, the network interface device 920 may include one or more physical jacks (e.g., Ethernet, coaxial, or phone jacks) or one or more antennas to connect to the communications network 926. In an example, the network interface device 920 may include one or more antennas 960 to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Example 1 is a system, comprising: hardware processing circuitry; and one or more hardware memories storing instructions that when executed configure the hardware processing circuitry to perform operations comprising: determining historical frequencies of vehicle-to-everything (V2X) messages in each of a plurality of regions; determining historical trips by vehicles through each of the plurality of regions; determining, based on the historical trips, a need for V2X coverage in each of the plurality of regions during a prospective time period; receiving a travel request for travel from an origin to a destination during the prospective time period; identifying the historical frequencies applicable to the prospective time period; determining a first route based on the identified historical frequencies and the need for V2X coverage; assigning the first route to a first vehicle; and responding to the travel request based on the assigning.

In Example 2, the subject matter of Example 1 optionally includes the operations further comprising: determining a plurality of routes of a corresponding plurality of prospective vehicle trips, each of the plurality of routes traversing one or more of the plurality of regions; and determining, based on the identified historical frequencies, further based on the need for V2X coverage, and further based on the plurality of routes, a second plurality of regions having inadequate V2X density, wherein the determining of the first route is based on the second plurality of regions.

In Example 3, the subject matter of Example 2 optionally includes the operations further comprising: predicting a number of prospective vehicle trips in each of the plurality of regions based on the determined plurality of routes and the need for V2X coverage; and determining a subset of the plurality of regions having a predicted number of prospective vehicle trips meeting a first criterion and having a historical frequency meeting a second criterion, wherein the second plurality of regions is based on the subset.

In Example 4, the subject matter of any one or more of Examples 2-3 optionally include wherein the determining of the first route includes a first region of the second plurality of regions in the first route based on the first region having inadequate V2X density.

In Example 5, the subject matter of Example 4 optionally includes wherein the determining of the first route assigns the first region as a destination of the first route based on the first region having inadequate V2X density, and wherein the assigning of the first route to the first vehicle is based on an idle status of the first vehicle.

In Example 6, the subject matter of any one or more of Examples 4-5 optionally include the operations further comprising: determining an amount and distribution over time of vehicle traffic necessary to provide adequate V2X density in the first region; generating a plurality of routes to include the first region based on the determined amount and the distribution over time; and assigning a corresponding plurality of idle vehicles to the plurality of routes.

In Example 7, the subject matter of Example 6 optionally includes the operations further comprising determining an availability of parking in the first region or a proximity of the idle vehicle to the first region, wherein the assigning of the second route to the idle vehicle is based on the availability or proximity.

In Example 8, the subject matter of any one or more of Examples 2-7 optionally include wherein the determining of the first route excludes a first region of the second plurality of regions based on the first region having inadequate V2X density.

In Example 9, the subject matter of any one or more of Examples 4-8 optionally include the operations further comprising: receiving, from a vehicle, a notification that it is available to provide V2X data, the notification further indicating the vehicle is located in the first region; requesting, from the vehicle, V2X data based on the notification, the indicated location, and that the first region has inadequate V2X density; and obtaining V2X data generated by the vehicle, wherein the determining of the historical frequencies is based on the V2X data generated by the vehicle.

Example 10 is at least one non-transitory computer readable storage medium comprising instructions that, when executed, configure hardware processing circuitry to perform operations comprising: determining historical frequencies of vehicle to everything (V2X) messages in each of a plurality of regions; determining historical trips by vehicles through each of the plurality of regions; determining, based on the historical trips, a need for V2X coverage in each of the plurality of regions during a prospective time period; receiving a travel request for travel from an origin to a destination during the prospective time period; identifying the historical frequencies applicable to the prospective time period; determining a first route based on the identified historical frequencies and the need for V2X coverage; assigning the first route to a first vehicle; and responding to the travel request based on the assigning.

In Example 11, the subject matter of Example 10 optionally includes the operations further comprising: determining a plurality of routes of a corresponding plurality of prospective vehicle trips, each of the plurality of routes traversing one or more of the plurality of regions; and determining, based on the identified historical frequencies, further based on the need for V2X coverage, and further based on the plurality of routes, a second plurality of regions having inadequate V2X density, wherein the determining of the first route is based on the second plurality of regions.

In Example 12, the subject matter of Example 11 optionally includes the operations further comprising: predicting a number of prospective vehicle trips in each of the plurality of regions based on the determined plurality of routes and the need for V2X coverage; and determining a subset of the plurality of regions having a predicted number of prospective vehicle trips meeting a first criterion and having a historical frequency meeting a second criterion, wherein the second plurality of regions is based on the subset.

In Example 13, the subject matter of any one or more of Examples 11-12 optionally includes wherein the determining of the first route includes a first region of the second plurality of regions in the first route based on the first region having inadequate V2X density.

In Example 14, the subject matter of Example 13 optionally includes wherein the determining of the first route assigns the first region as a destination of the first route based on the first region having inadequate V2X density, and wherein the assigning of the first route to the first vehicle is based on an idle status of the first vehicle.

In Example 15, the subject matter of Example 14 optionally includes the operations further comprising: determining an amount and distribution over time of vehicle traffic necessary to provide adequate V2X density in the first region; generating a plurality of routes to include the first region based on the determined amount and the distribution over time; and assigning a corresponding plurality of idle vehicles to the plurality of routes.

In Example 16, the subject matter of Example 15 optionally includes the operations further comprising determining an availability of parking in the first region or a proximity of the idle vehicle to the first region, wherein the assigning of the second route to the idle vehicle is based on the availability or proximity.

In Example 17, the subject matter of any one or more of Examples 11-16 optionally include wherein the determining of the first route excludes a first region of the second plurality of regions based on the first region having inadequate V2X density.

In Example 18, the subject matter of any one or more of Examples 13-17 optionally include the operations further comprising: receiving, from a vehicle, a notification that it is available to provide V2X data, the notification further indicating the vehicle is located in the first region; requesting, from the vehicle, V2X data based on the notification, the indicated location, and that the first region has inadequate V2X density, and obtaining V2X data generated by the vehicle, wherein the determining of the historical frequencies is based on the V2X data generated by the vehicle.

Example 19 is a method, comprising: determining historical frequencies of vehicle to everything (V2X) messages in each of a plurality of regions; determining historical trips by vehicles through each of the plurality of regions; determining, based on the historical trips, a need for V2X coverage in each of the plurality of regions during a prospective time period; receiving a travel request for travel from an origin to a destination during the prospective time period; identifying the historical frequencies applicable to the prospective time period; determining a first route based on the identified historical frequencies and the need for V2X coverage; assigning the first route to a first vehicle; and responding to the travel request based on the assigning.

In Example 20, the subject matter of Example 19 optionally includes determining a plurality of routes of a corresponding plurality of prospective vehicle trips, each of the plurality of routes traversing one or more of the plurality of regions; and determining, based on the identified historical frequencies, further based on the need for V2X coverage, and further based on the plurality of routes, a second plurality of regions having inadequate V2X density, wherein the determining of the first route is based on the second plurality of regions.

In Example 21, the subject matter of Example 20 optionally includes predicting a number of prospective vehicle trips in each of the plurality of regions based on the determined plurality of routes and the need for V2X coverage; and determining a subset of the plurality of regions having a predicted number of prospective vehicle trips meeting a first criterion and having a historical frequency meeting a second criterion, wherein the second plurality of regions is based on the subset.

In Example 22, the subject matter of any one or more of Examples 20-21 optionally include predicting a number of prospective vehicle trips in each of the plurality of regions based on the determined plurality of routes and the need for V2X coverage; and determining a subset of the plurality of regions having a predicted number of prospective vehicle trips meeting a first criterion and having a historical frequency meeting a second criterion, wherein the second plurality of regions is based on the subset.

In Example 23, the subject matter of any one or more of Examples 20-22 optionally include wherein the determining of the first route includes a first region of the second plurality of regions in the first route based on the first region having inadequate V2X density.

In Example 24, the subject matter of Example 23 optionally includes wherein the determining of the first route assigns the first region as a destination of the first route based on the first region having inadequate V2X density, and wherein the assigning of the first route to the first vehicle is based on an idle status of the first vehicle.

In Example 25, the subject matter of any one or more of Examples 21-24 optionally include determining an amount and distribution over time of vehicle traffic necessary to provide adequate V2X density in the first region; generating a plurality of routes to include the first region based on the determined amount and the distribution over time; and assigning a corresponding plurality of idle vehicles to the plurality of routes.

In Example 26, the subject matter of Example 25 optionally includes determining an availability of parking in the first region or a proximity of the idle vehicle to the first region, wherein the assigning of the second route to the idle vehicle is based on the availability or proximity.

In Example 27, the subject matter of any one or more of Examples 20-26 optionally include wherein the determining of the first route excludes a first region of the second plurality of regions based on the first region having inadequate V2X density.

In Example 28, the subject matter of any one or more of Examples 22-27 optionally include receiving, from a vehicle, a notification that it is available to provide V2X data, the notification further indicating the vehicle is located in the first region; requesting, from the vehicle, V2X data based on the notification, the indicated location, and that the first region has inadequate V2X density; and obtaining V2X data generated by the vehicle, wherein the determining of the historical frequencies is based on the V2X data generated by the vehicle.

Example 29 is an apparatus, comprising: means for determining historical frequencies of vehicle to everything (V2X) messages in each of a plurality of regions; means for determining historical trips by vehicles through each of the plurality of regions; means for determining, based on the historical trips, a need for V2X coverage in each of the plurality of regions during a prospective time period; means for receiving a travel request for travel from an origin to a destination during the prospective time period; means for identifying the historical frequencies applicable to the prospective time period; means for determining a first route based on the identified historical frequencies and the need for V2X coverage; means for assigning the first route to a first vehicle; and means for responding to the travel request based on the assigning.

In Example 30, the subject matter of Example 29 optionally includes means for determining a plurality of routes of a corresponding plurality of prospective vehicle trips, each of the plurality of routes traversing one or more of the plurality of regions; and means for determining, based on the identified historical frequencies, further based on the need for V2X coverage, and further based on the plurality of routes, a second plurality of regions having inadequate V2X density, wherein the determining of the first route is based on the second plurality of regions.

In Example 31, the subject matter of Example 30 optionally includes means for predicting a number of prospective vehicle trips in each of the plurality of regions based on the determined plurality of routes and the need for V2X coverage; and means for determining a subset of the plurality of regions having a predicted number of prospective vehicle trips meeting a first criterion and having a historical frequency meeting a second criterion, wherein the second plurality of regions is based on the subset.

In Example 32, the subject matter of any one or more of Examples 30-31 optionally include means for predicting a number of prospective vehicle trips in each of the plurality of regions based on the determined plurality of routes and the need for V2X coverage; and means for determining a subset of the plurality of regions having a predicted number of prospective vehicle trips meeting a first criterion and having a historical frequency meeting a second criterion, wherein the second plurality of regions is based on the subset.

In Example 33, the subject matter of any one or more of Examples 30-32 optionally include wherein the means for determining the first route is configured to include a first region of the second plurality of regions in the first route based on the first region having inadequate V2X density.

In Example 34, the subject matter of Example 33 optionally includes wherein the means for determining the first route is configured to assign the first region as a destination of the first route based on the first region having inadequate V2X density, and wherein the assigning of the first route to the first vehicle is based on an idle status of the first vehicle.

In Example 35, the subject matter of any one or more of Examples 31-34 optionally include means for determining an amount and distribution over time of vehicle traffic necessary to provide adequate V2X density in the first region; means for generating a plurality of routes to include the first region based on the determined amount and the distribution over time; and means for assigning a corresponding plurality of idle vehicles to the plurality of routes.

In Example 36, the subject matter of Example 35 optionally includes means for determining an availability of parking in the first region or a proximity of the idle vehicle to the first region, wherein the means for assigning the second route to the idle vehicle is configured to assign the second route based on the availability or proximity.

In Example 37, the subject matter of any one or more of Examples 30-36 optionally include wherein the means for determining the first route is configured to exclude a first region of the second plurality of regions based on the first region having inadequate V2X density.

In Example 38, the subject matter of any one or more of Examples 30-37 optionally include means for receiving, from a vehicle, a notification that it is available to provide V2X data, the notification further indicating the vehicle is located in the first region; means for requesting, from the vehicle, V2X data based on the notification, the indicated location, and that the first region has inadequate V2X density; and means for obtaining V2X data generated by the vehicle, wherein the determining of the historical frequencies is based on the V2X data generated by the vehicle.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

What is claimed is:

1. A vehicle control system, comprising:
hardware processing circuitry; and
one or more hardware memories storing instructions that when executed configure the hardware processing circuitry to perform operations comprising:
    determining historical frequencies of vehicle-to-everything (V2X) messages in each of a plurality of regions based on information received via at least one wireless communication link from V2X-enabled vehicles, the information indicating a count of the V2X messages received by the V2X-enabled vehicles while traveling the plurality of regions and across different time periods;
    determining a number of historical trips by the V2X-enabled vehicles through each of the plurality of regions;
    determining, based on the number of historical trips and a number of V2X messages exchanged by the V2X-enabled vehicles during the historical trips, a V2X coverage gap associated with a need for V2X wireless coverage in each of the plurality of regions during a prospective time period;
    receiving via at least one wireless communication link, a travel request for travel from an origin to a destination during the prospective time period;
    identifying the historical frequencies applicable to the prospective time period;
    determining a first route including the origin and the destination based on the identified historical frequencies and the need for the V2X wireless coverage; and
    controlling repositioning of an autonomous vehicle of the V2X-enabled vehicles along the first route, the autonomous vehicle to provide the V2X wireless coverage to fill the V2X coverage gap.

2. The vehicle control system of claim 1, the operations further comprising:
    determining a plurality of routes of a corresponding plurality of prospective vehicle trips, each of the plurality of routes traversing one or more of the plurality of regions; and
    determining, based on the identified historical frequencies, further based on the need for the V2X wireless coverage, and further based on the plurality of routes, a second plurality of regions having inadequate V2X density, wherein the determining of the first route is based on the second plurality of regions.

3. The vehicle control system of claim 2, the operations further comprising:
    predicting a number of prospective vehicle trips in each of the plurality of regions based on the determined plurality of routes and the need for the V2X wireless coverage; and
    determining a subset of the plurality of regions having a predicted number of prospective vehicle trips meeting a first criterion and having a historical frequency meeting a second criterion, wherein the second plurality of regions is based on the subset.

4. The vehicle control system of claim 2, wherein the determining of the first route includes a first region of the second plurality of regions in the first route based on the first region having inadequate V2X density.

5. The vehicle control system of claim 4, wherein the determining of the first route assigns the first region as a destination of the first route based on the first region having inadequate V2X density, and wherein the assigning of the first route to the autonomous vehicle is based on an idle status of the autonomous vehicle.

6. The vehicle control system of claim 4, the operations further comprising:
    determining an amount and distribution over time of vehicle traffic necessary to provide adequate V2X density in the first region;
    generating a plurality of routes to include the first region based on the determined amount and the distribution over time; and
    assigning a corresponding plurality of idle V2X-enabled vehicles to the plurality of routes.

7. The vehicle control system of claim 6, the operations further comprising determining availability of parking in the first region or proximity of the idle vehicle to the first region, wherein the assigning of the second route to the idle vehicle is based on the availability or the proximity.

8. The vehicle control system of claim 2, wherein the determining of the first route excludes a first region of the second plurality of regions based on the first region having inadequate V2X density.

9. The vehicle control system of claim 4, the operations further comprising:
    receiving, from a vehicle, a notification that it is available to provide V2X data, the notification further indicating the vehicle is located in the first region;
    requesting, from the vehicle, V2X data based on the notification, the indicated location, and that the first region has inadequate V2X density; and
    obtaining V2X data generated by the vehicle, wherein the determining of the historical frequencies is based on the V2X data generated by the vehicle.

10. At least one non-transitory computer-readable storage medium comprising instructions that, when executed, configure hardware processing circuitry to perform operations comprising:
    determining historical frequencies of vehicle-to-everything (V2X) messages in each of a plurality of regions based on information received via at least one wireless communication link from V2X-enabled vehicles, the information indicating a count of the V2X messages received by the V2X-enabled vehicles while traveling the plurality of regions and across different time periods;

determining a number of historical trips by V2X-enabled vehicles through each of the plurality of regions;

determining, based on the number of historical trips and a number of V2X messages exchanged by the V2X-enabled vehicles during the historical trips, a V2X coverage gap associated with a need for V2X wireless coverage in each of the plurality of regions during a prospective time period;

receiving via at least one wireless communication link, a travel request for travel from an origin to a destination during the prospective time period;

identifying the historical frequencies applicable to the prospective time period;

determining a first route including the origin and the destination based on the identified historical frequencies and the need for the V2X wireless coverage; and controlling repositioning of an autonomous vehicle of the V2X-enabled vehicles along the first route, the autonomous vehicle to provide the V2X wireless coverage to fill the V2X coverage gap.

11. The at least one non-transitory computer-readable storage medium of claim 10, the operations further comprising:

determining a plurality of routes of a corresponding plurality of prospective vehicle trips, each of the plurality of routes traversing one or more of the plurality of regions; and determining, based on the identified historical frequencies, further based on the need for the V2X wireless coverage, and further based on the plurality of routes, a second plurality of regions having inadequate V2X density, wherein the determining of the first route is based on the second plurality of regions.

12. The at least one non-transitory computer-readable storage medium of claim 11, the operations further comprising:

predicting a number of prospective vehicle trips in each of the plurality of regions based on the determined plurality of routes and the need for the V2X wireless coverage; and determining a subset of the plurality of regions having a predicted number of prospective vehicle trips meeting a first criterion and having a historical frequency meeting a second criterion, wherein the second plurality of regions is based on the subset.

13. The at least one non-transitory computer-readable storage medium of claim 11, wherein the determining of the first route includes a first region of the second plurality of regions in the first route based on the first region having inadequate V2X density.

14. The at least one non-transitory computer-readable storage medium of claim 13, wherein the determining of the first route assigns the first region as a destination of the first route based on the first region having inadequate V2X density, and wherein the assigning of the first route to the autonomous vehicle is based on an idle status of the autonomous vehicle.

15. The at least one non-transitory computer-readable storage medium of claim 14, the operations further comprising:

determining an amount and distribution over time of vehicle traffic necessary to provide adequate V2X density in the first region;

generating a plurality of routes to include the first region based on the determined amount and the distribution over time; and assigning a corresponding plurality of idle V2X-enabled vehicles to the plurality of routes.

16. The at least one non-transitory computer-readable storage medium of claim 15, the operations further comprising determining availability of parking in the first region or proximity of the idle vehicle to the first region, wherein the assigning of the second route to the idle vehicle is based on the availability or the proximity.

17. The at least one non-transitory computer-readable storage medium of claim 11, wherein the determining of the first route excludes a first region of the second plurality of regions based on the first region having inadequate V2X density.

18. The at least one non-transitory computer-readable storage medium of claim 13, the operations further comprising:

receiving, from a vehicle, a notification that it is available to provide V2X data, the notification further indicating the vehicle is located in the first region;

requesting, from the vehicle, V2X data based on the notification, the indicated location, and that the first region has inadequate V2X density; and obtaining V2X data generated by the vehicle, wherein the determining of the historical frequencies is based on the V2X data generated by the vehicle.

19. A vehicle control apparatus, comprising:

means for determining historical frequencies of vehicle-to-everything (V2X) messages in each of a plurality of regions based on information received via at least one wireless communication link from V2X-enabled vehicles, the information indicating a count of the V2X messages received by the V2X-enabled vehicles while traveling the plurality of regions and across different time periods;

means for determining a number of historical trips by V2X-enabled vehicles through each of the plurality of regions;

means for determining, based on the number of historical trips and a number of V2X messages exchanged by the V2X-enabled vehicles during the historical trips, a V2X coverage gap associated with a need for V2X wireless coverage in each of the plurality of regions during a prospective time period;

means for receiving via at least one wireless communication link, a travel request for travel from an origin to a destination during the prospective time period;

means for identifying the historical frequencies applicable to the prospective time period;

means for determining a first route including the origin and the destination based on the identified historical frequencies and the need for the V2X wireless coverage; and means for controlling repositioning of an autonomous vehicle of the V2X-enabled vehicles along the first route, the autonomous vehicle to provide the V2X wireless coverage to fill the V2X coverage gap.

20. The vehicle control apparatus of claim 19, further comprising:

means for determining a plurality of routes of a corresponding plurality of prospective vehicle trips, each of the plurality of routes traversing one or more of the plurality of regions;

means for determining, based on the identified historical frequencies, further based on the need for the V2X wireless coverage, and further based on the plurality of routes, a second plurality of regions having inadequate V2X density, wherein the determining of the first route is based on the second plurality of regions;

means for predicting a number of prospective vehicle trips in each of the plurality of regions based on the determined plurality of routes and the need for the V2X wireless coverage; and means for determining a subset of the plurality of regions having a predicted number of prospective vehicle trips meeting a first criterion and having a historical frequency meeting a second criterion, wherein the second plurality of regions is based on the subset.

* * * * *